United States Patent
Duffield et al.

(10) Patent No.: US 8,001,601 B2
(45) Date of Patent: Aug. 16, 2011

(54) METHOD AND APPARATUS FOR LARGE-SCALE AUTOMATED DISTRIBUTED DENIAL OF SERVICE ATTACK DETECTION

(75) Inventors: Nicholas Duffield, Summit, NJ (US); Jacobus Van Der Merwe, New Providence, NJ (US); Vyas Sekar, Pittsburgh, PA (US); Oliver Spatscheck, Randolph, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1040 days.

(21) Appl. No.: 11/452,623

(22) Filed: Jun. 14, 2006

(65) Prior Publication Data

US 2007/0283436 A1 Dec. 6, 2007

Related U.S. Application Data

(60) Provisional application No. 60/810,497, filed on Jun. 2, 2006.

(51) Int. Cl.
*G06F 11/00* (2006.01)
*G06F 12/14* (2006.01)
*G06F 12/16* (2006.01)
*G08B 23/00* (2006.01)

(52) U.S. Cl. ............... 726/23; 713/188; 713/194
(58) Field of Classification Search ........ 726/23
See application file for complete search history.

(56) References Cited

U.S. PATENT DOCUMENTS

| | | | |
|---|---|---|---|
| 6,477,669 B1 | 11/2002 | Agarwal et al. | |
| 6,499,107 B1 | 12/2002 | Gleichauf et al. | |
| 6,598,034 B1 | 7/2003 | Kloth | |
| 6,636,512 B1 | 10/2003 | Lorrain et al. | |
| 6,654,373 B1 | 11/2003 | Maher, III et al. | |
| 6,675,211 B1 | 1/2004 | Mamaghani et al. | |
| 6,687,732 B1 | 2/2004 | Bector et al. | |
| 6,725,378 B1 | 4/2004 | Schuba et al. | |
| 6,735,219 B1 | 5/2004 | Clauberg | |
| 6,735,702 B1 | 5/2004 | Yavatkar et al. | |
| 6,738,814 B1 | 5/2004 | Cox et al. | |
| 6,742,123 B1 | 5/2004 | Foote | |
| 6,751,668 B1 | 6/2004 | Lin et al. | |
| 6,772,334 B1 | 8/2004 | Glawitsch | |
| 6,775,657 B1 | 8/2004 | Baker | |

(Continued)

OTHER PUBLICATIONS

Chen, Yao-Min, et al., "Policy Management for Network-Based Intrusion Detection and Prevention", Network Operations & Management Symposium, 2004, pp. 219-232.

(Continued)

*Primary Examiner* — Taghi T Arani
*Assistant Examiner* — Narciso Victoria

(57) ABSTRACT

A multi-staged framework for detecting and diagnosing Denial of Service attacks is disclosed in which a low-cost anomaly detection mechanism is first used to collect coarse data, such as may be obtained from Simple Network Management Protocol (SNMP) data flows. Such data is analyzed to detect volume anomalies that could possibly be indicative of a DDoS attack. If such an anomaly is suspected, incident reports are then generated and used to trigger the collection and analysis of fine grained data, such as that available in Netflow data flows. Both types of collection and analysis are illustratively conducted at edge routers within the service provider network that interface customers and customer networks to the service provider. Once records of the more detailed information have been retrieved, they are examined to determine whether the anomaly represents a distributed denial of service attack, at which point an alarm is generated.

30 Claims, 8 Drawing Sheets

U.S. PATENT DOCUMENTS

| | | |
|---|---|---|
| 6,789,203 B1 | 9/2004 | Belissent |
| 6,801,503 B1 | 10/2004 | Wetherall et al. |
| 6,816,910 B1 | 11/2004 | Ricciulli |
| 6,901,517 B1 | 5/2005 | Redmore |
| 6,904,459 B1 | 6/2005 | Alam et al. |
| 6,911,827 B2 * | 6/2005 | Kantorovich et al. ......... 324/615 |
| 6,928,549 B2 | 8/2005 | Brock et al. |
| 6,944,673 B2 | 9/2005 | Malan et al. |
| 6,957,258 B2 | 10/2005 | Maher, II et al. |
| 6,965,574 B1 | 11/2005 | Cook et al. |
| 6,965,922 B1 | 11/2005 | Holland et al. |
| 7,058,974 B1 | 6/2006 | Maher, II et al. |
| 7,278,159 B2 * | 10/2007 | Kaashoek et al. ............... 726/22 |
| 7,363,656 B2 * | 4/2008 | Weber et al. .................... 726/23 |
| 7,506,372 B2 * | 3/2009 | Mulrane et al. ................. 726/22 |
| 2002/0101819 A1 | 8/2002 | Goldstone |
| 2002/0107953 A1 | 8/2002 | Ontiveros et al. |
| 2002/0108059 A1 | 8/2002 | Canion et al. |
| 2002/0131366 A1 | 9/2002 | Sharp et al. |
| 2002/0133586 A1 | 9/2002 | Shanklin et al. |
| 2002/0147925 A1 | 10/2002 | Lingafelt et al. |
| 2002/0169982 A1 | 11/2002 | Brock et al. |
| 2002/0174220 A1 | 11/2002 | Johnson |
| 2002/0184362 A1 | 12/2002 | Banerjee et al. |
| 2003/0009554 A1 | 1/2003 | Burch et al. |
| 2004/0148520 A1 | 7/2004 | Talpade et al. |
| 2004/0199793 A1 * | 10/2004 | Wilken et al. .................. 713/201 |
| 2005/0111367 A1 | 5/2005 | Jonathan Chao et al. |
| 2006/0272018 A1 * | 11/2006 | Fouant ............................ 726/23 |

OTHER PUBLICATIONS

PCT International Search Report corresponding to PCT Patent Application PCT/US2007/012125 filed May 22, 2007 (4 pages).

PCT Written Opinion of the International Searching Authority corresponding to PCT Patent Application PCT/US2007/012125 filed May 22, 2007 (7 pages).

* cited by examiner

FIG. 4A

```
TIMEDOMAINMODELING(TS, W, N)
    -TS is the training set
    -W is the number of weeks
    -N is the number of data points per week
    for i <- 1 To N
        do
            P(i) <- MEAN(TS (1 : W, i)) —— 401
            P' <- DENOISE(P) —— 402
            V(i) <- VARIANCEMODEL(TS, P', W, N) —— 403
    return P', V
```

FIG. 4B

```
ANOMALYDETECTION(T, TS, W, N,)
    -T is the new times series
    -TS is the historical time series
    -W is the number of weeks for building model -
    -N is the number of data points per week
    (P, V) <- TIMEDOMAINMODELING(TS, W, N) —— 404
    for i <- 1 To N
        do
            D(i) <- (T(i) - P(i))/V(i) —— 405
            Do TEMPORALCLUSTER(D, $\alpha_{trigger}$, $\alpha_{add}$, keepalive) —— 406
    Use filtering rules on clustered alarms —— 411
```

FIG. 4C

TEMPORALCLUSTER(D, $\alpha_{trigger}$, $\alpha_{add}$ keepalive)
    -D is the deviation score time series
    -$\alpha_{trigger}$ is trigger deviation score threshold
    -$\alpha_{add}$ is the score threshold for extending an event
    -keepalive is the time for which an event is active
    -The output is the set alarms
for i <- 1 to N
    -Flag keeps track whether there is an ongoing alarm
    -T is the current time
    -ST keeps track of event time

```
Do
    if (Flag = TRUE)
        then
            if D(i) ≥ α_add                              ⎫
                then Extend the event                    ⎬ 407
                -E is the current event                  ⎪
            ΔT <- T - ST (E)                             ⎭
            if ΔT ≥ keepalive                            ⎫
                then Flag <- FALSE else                  ⎬ 408
            if D(i) ≥ α_trigger then                     ⎭
                Create a new event E'      ⎫
                Flag <- TRUE               ⎬ 409
                ST(E·) <- T                ⎭
        Return alarms with durations and scores ———— 410
```

FIG. 6

UNIDIMENSIONALCLUSTERING(MinPrefix, Threshold, Specificity)
- MinPrefix is the minimum prefix length - Set to 28
- MaxPrefix is the maximum IP prefix length (32 for IPv4)
- Threshold is given in terms of an attack rate
- Specificity is used for compressing the report - Set to 1.5

*Aggregation:* Read flow records and update traffic counts for each unique prefix between MinPrefix and MaxPrefix — 601
*Reporting:* for i <- MaxPrefix to MinPrefix
  do
    for each Prefix P of prefix-length i
    do
      - Use the IP/Prefix notation, P/{i} refers to prefix P with a prefix mask of length i
      AbsoluteThreshold <- Specificity$^{(MaxPrefix - i)}$ x Threshold
      if i ≠ MaxPrefix
        then CompressThreshold <- Specificity x PredictedVol(P/{i})
        else CompressThreshold <- 0
      ReportThreshold <- Max(AbsoluteThreshold, CompressThreshold)
      if Volume(P) > ReportThreshold
        then Report alarm on prefix P/{i} with rate Volume(P)
      PredictedVol(P/{i-1}) <- Max(PredictedVol(P/{i-1}), Volume(P))

— 602

METHOD AND APPARATUS FOR LARGE-SCALE AUTOMATED DISTRIBUTED DENIAL OF SERVICE ATTACK DETECTION

This application claims the benefit of U.S. Provisional Application No. 60/810,497, filed on Jun. 2, 2006, which is incorporated herein by reference

BACKGROUND OF THE INVENTION

The present invention relates generally to the detection and prevention of malicious attacks over computer networks and, more particularly, to the automatic detection of large-scale denial of service attacks.

As computer networks have increased in number, size and complexity, the number of attacks directed toward those networks has also increased. One such type of attack, known as a denial of service (DoS) attack is an attack on a computer network that may cause a loss of service to users, typically by consuming the bandwidth of a network or by overloading the computational resources of the network. In these attacks, a target network is typically flooded with an overwhelming number of packets to saturate the network connections and/or to deplete network resources. A common way of initiating such attacks is via Distributed Denial of Service (DDoS), which typically uses a widely-distributed network of computers that have been compromised (e.g., via viruses, Trojan horse or other well-known means) to permit an attacker to control the computers remotely. Then, at a time of the attacker's choosing, these compromised computers attack the target simultaneously and flood that target with packets.

As a result of the threat posed by DDoS attacks, attempts have been made to detect such attacks and, ultimately, to prevent them. Such prior detection techniques generally used either coarse-grained detection techniques or, alternatively, fine-grained detection techniques to identify anomalies that could indicate a DDoS attack was underway. As used herein, the term coarse-grained data is defined as data from which only a high-level overview of the flow of data, such as time series trends, may be obtained. Analysis of such coarse-grained data to detect DDoS attacks typically involves time-series forecasting and signal processing to detect larger, more significant events that could indicate a DDoS attack. On the other hand, the term fine-grained data is defined as data from which a detailed analysis of individual elements or clusters of elements of data can be obtained. Analysis of fine grained data, for example, enables the analysis of flow or packet-header data to detect much more subtle events indicative of a DDoS attack. In some implementations, such techniques are deployed in monitoring systems within the core of the service provider network. However, implementing such monitoring systems in the traffic-heavy core network using either technique makes it difficult to detect the relatively subtle indications of some attacks that, while possibly small relative to the aggregate traffic in the core network, could still overwhelm a targeted network. Additionally, fine-grained detection techniques usually are not suitable for such traffic-intensive monitoring for the additional reason that these techniques require significant processing capabilities and/or time to detect such subtle anomalies and, as a result, are relatively more expensive to implement.

Other detection methods have been developed for use by an end user (i.e., a customer of a service provider) to detect DDoS attacks. However, such methods are typically ineffective at detecting the DDoS attacks prior to loss of service. This is because, once a DDoS attack begins, the bandwidth capacity of the access link connecting the user to a service provider may quickly become consumed and/or the packet handling capacity of routers of the service provider or user can be quickly overloaded. Thus, once this occurs, there is little that the target of the attack can do independently to alleviate the loss of service.

SUMMARY OF THE INVENTION

The present inventors have recognized that there is a need for a more effective method for detecting and, ultimately, stopping DDoS attacks. Therefore, the present inventors have invented a new multi-staged framework for detecting and diagnosing Denial of Service attacks. According to this framework, a low-cost anomaly detection mechanism is first used to collect and analyze coarse data, such as that present in Simple Network Management Protocol (SNMP) data flows, to detect volume anomalies that could possibly be indicative of a DDoS attack. If such an anomaly is detected, incident reports are then generated and used to trigger the collection and analysis of fine grained data, such as that available in Netflow data flows. One skilled in the art will recognize that both fine grained and coarse grained data may alternatively be obtained from the same data flow. Both types of collection and analysis are illustratively conducted at edge routers within the service provider network that interface customers and customer networks to the service provider. Both SNMP and Netflow information are readily available at these edge routers. Once records of the more detailed information have been retrieved, they are examined to determine whether the anomaly represents a distributed denial of service attack. An alarm is generated if it is determined that the anomaly is in fact such an attack.

Accordingly, more expensive and time consuming fine-grained detection techniques are used only when a trigger is generated based on a less expensive coarser granularity detection. These and other advantages of the invention will be apparent to those of ordinary skill in the art by reference to the following detailed description and the accompanying drawings.

BRIEF DESCRIPTION OF THE DRAWINGS

FIGS. 4A, 4B and 4C are algorithms for performing the illustrative lightweight anomaly detection method of FIG. 3;

FIG. 6 is an algorithm for performing the illustrative focused anomaly detection method of FIG. 5.

DETAILED DESCRIPTION

Figure 1:
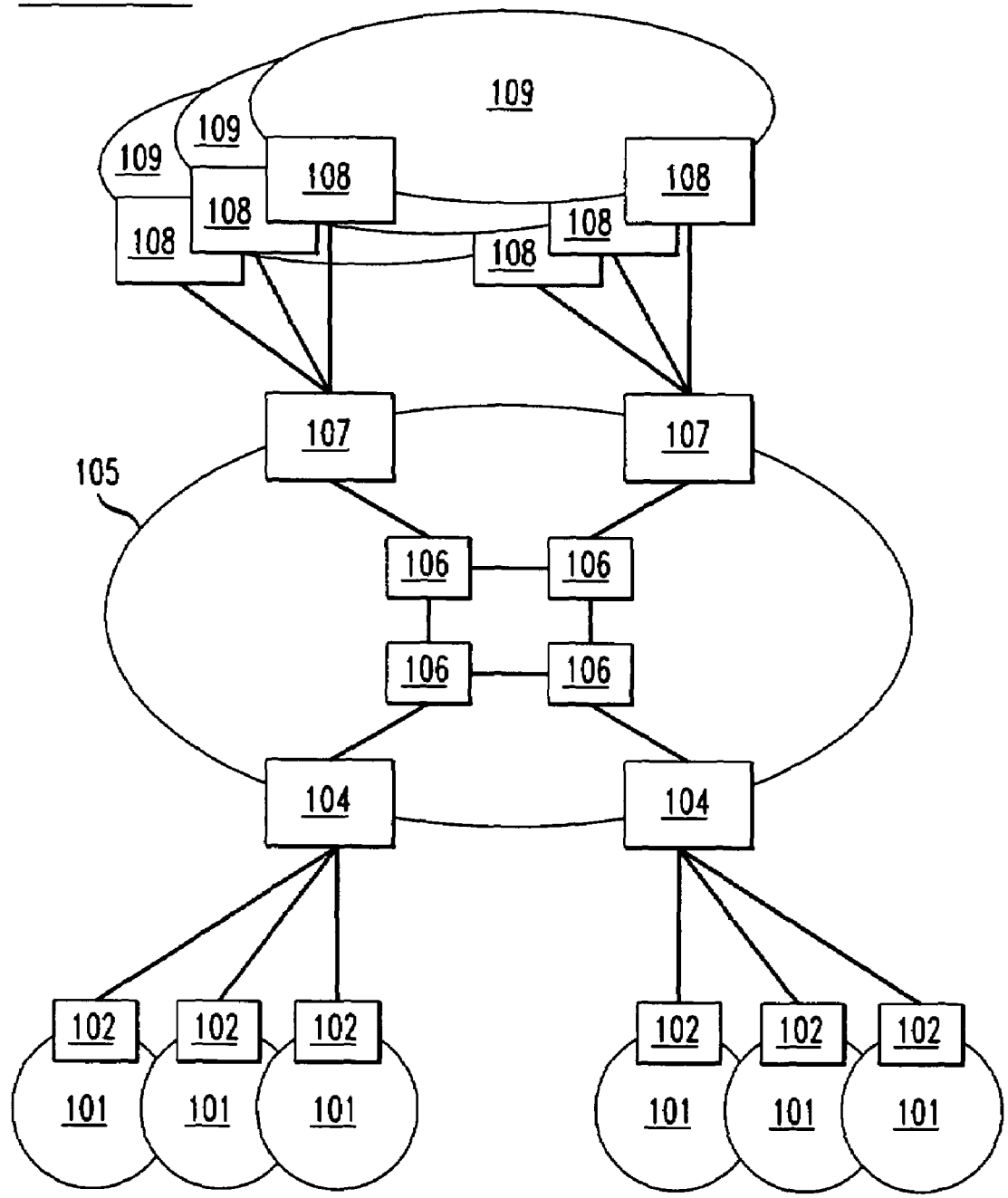
FIG. 1 shows block diagram of a service provider network.

FIG. 1 shows an illustrative service provider network useful in providing voice and/or data telecommunication services to customers. Referring to that figure, network 100 has, for example, service provider backbone network 105 having illustrative core routers 106 for routing communication traffic across the network. Backbone network 105 typically also has, for example, computer servers and other functionality (not shown) for providing various services and applications to different communication sessions from different customers. Backbone network 105 uses illustrative edge routers 104 and 107 to interface with external networks and/or entities. Specifically, in FIG. 1, backbone network 105 uses customer-provider edge routers 104 to interface with customer networks 101 via, for example, customer edge routers 102. Network 105 also uses peering provider edge routers 107 for interfacing, for example, with peer service provider networks 109 via peering provider edge routers 108. One skilled in the art will recognize that edge routers and the methods for using such routers to interface various networks are extremely well-known in the art. Accordingly, such edge routers will not be discussed herein other than as is necessary for understanding the principles of the present invention.

As discussed previously, prior DDoS detection schemes are typically implemented in the core routers 106 or in the provider peering edge routers 107 of backbone network 105. This is typically because traffic tended to converge at these locations and, as a result, a relatively high volume of traffic is capable of being monitored at fewer locations in the network. Thus, the cost associated with implementing such a monitoring scheme is relatively low. However, as also discussed above, the large volume of traffic in the backbone network at these locations tends to provide less than optimal detection results.

Figure 2:
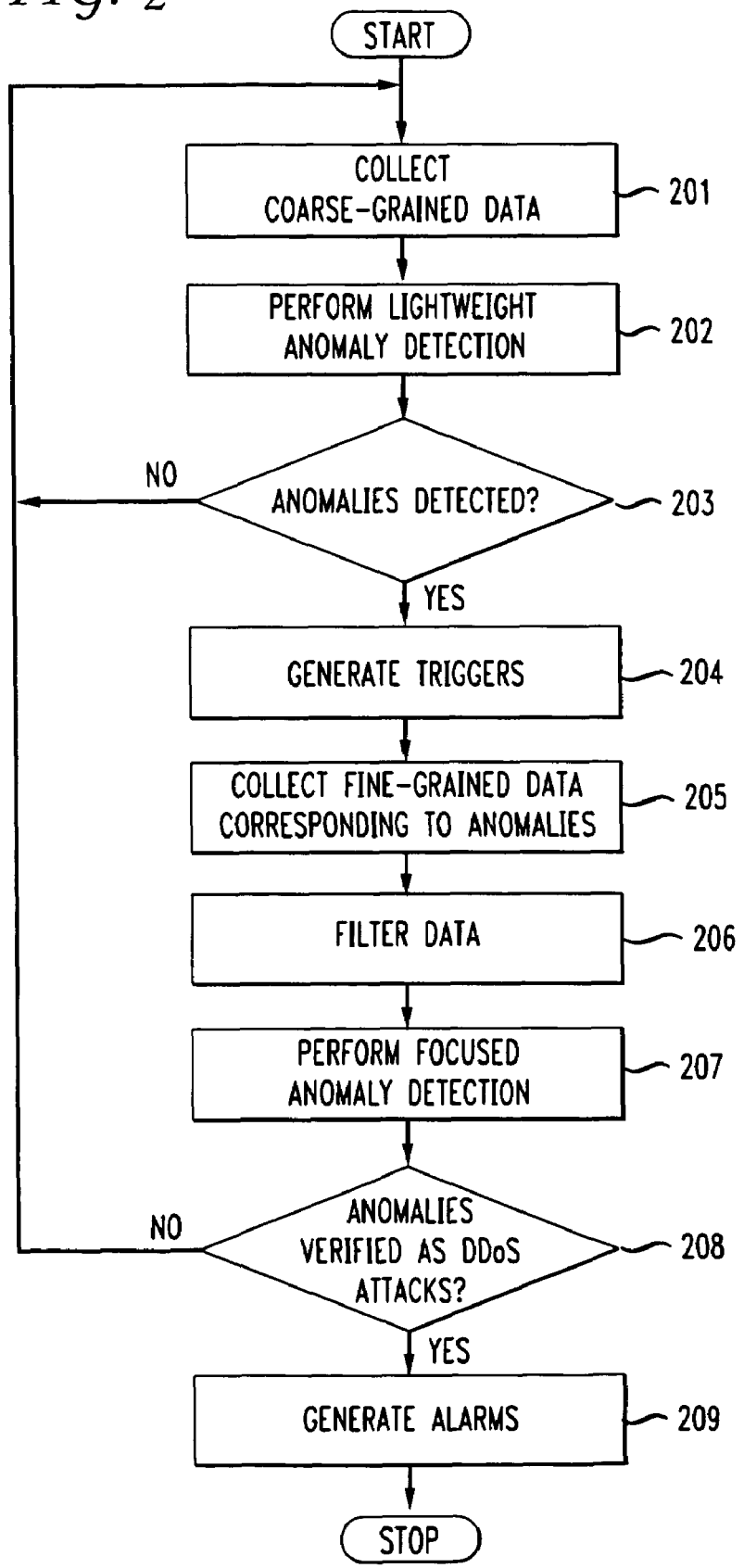
FIG. 2 is a flow diagram representing a high-level method in accordance with an embodiment of the present invention.

Therefore, in accordance with an embodiment of the present invention, a two-stage detection framework for detecting DDoS attacks is implemented at customer provider edge routers 104. Locating such a detection framework at customer provider edge routers is advantageous in that the traffic between the customers connected to any one such router is significantly less than the traffic in the core network or that experienced at peering provider edge routers. Thus, the more subtle indications that a DDoS attack is occurring are easier to detect. Additionally, in the event a valid DDoS attack does occur, steps can be taken in the service provider network to either block the attacking data or, alternatively, to reroute the customer in order to avoid the attack altogether. In one embodiment, two successive stages of detection are used at routers in the network, such as edge routers 104. FIG. 2 shows an illustrative high-level flow diagram illustrating such a two stage detection scheme. Referring to that figure, at step 201 coarse grained data, discussed herein below, is collected and, at step 202, trends within the coarse data are monitored at a coarse anomaly detection function, referred to herein as a lightweight anomaly detection function, also discussed further herein below. At step 203, if any anomalies possibly indicating the presence of a DDoS attack are detected by this coarse detection function, then one or more triggers are generated at step 204. If not, then monitoring of the coarse-grained data flow continues. Such triggers are used at step 205 to initiate a collection of fine-grained data 204, once again discussed in further detail herein below. One skilled in the art will recognize that both the fine grained data and coarse grained data may be obtained from a single flow of data or, alternatively, may be obtained from separate data flows. This fine grained data is filtered at step 206 and is analyzed at step 207 via a focused anomaly detection technique that is applied to the fine grained data. If anomalies are detected and/or verified at step 208 then, at step 209, alarms are generated. Otherwise, monitoring of coarse-grained data continues at step 201.

Figure 3:
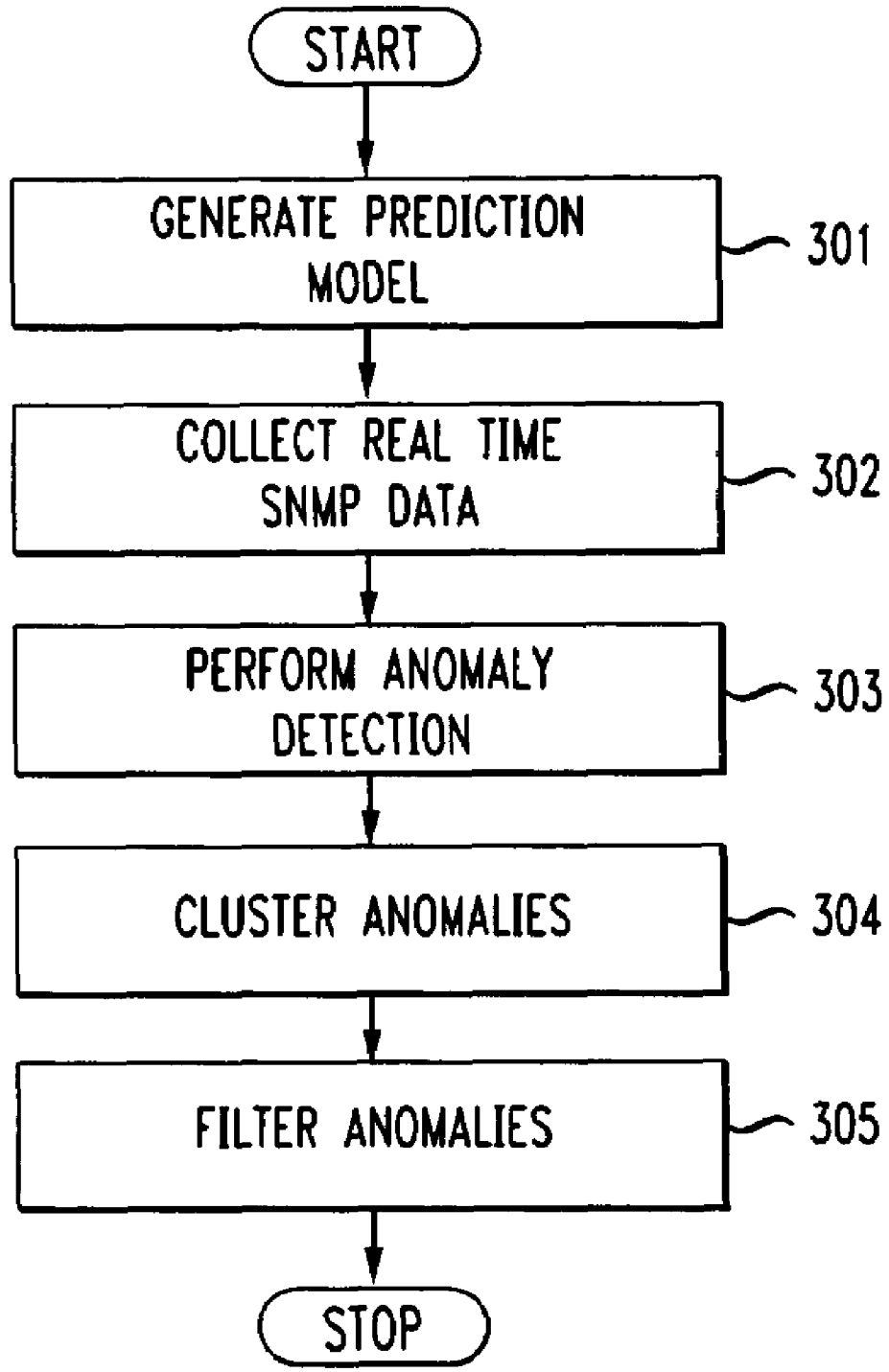
FIG. 3 is a flow diagram of an illustrative lightweight anomaly detection method in accordance with an embodiment of the present invention.

FIG. 3 shows a high-level flow of the first stage of detection, referred to herein as the lightweight anomaly detection stage. It is desirable to use such a detection technique to detect suspected anomalies in large volumes of data in order to reduce the cost of an anomaly detection system, since such a system will typically require a relatively low amount of processing resources. At step 301, a prediction model is generated based on training data, as discussed herein below. Then, at step 302, real time data is collected from, for example, Simple Network Management Protocol (SNMP) traffic. As one skilled in the art will recognize, SNMP is a very well known protocol used in IP networks to monitor and control network devices, as well as to manage configurations, statistics collection, performance, and security in the network. Among other information, devices (e.g., routers) in a network using SNMP may collect high level information such as MAC address of the respective device, as well as link utilization data, such as the total transmitted bytes, total transmitted packets, total received packets, packets received per second, and packets transmitted per second at that device. The present inventor has recognized that DDoS attacks are typically most visible via packet count statistics over the egress links of the customers under attack (i.e., links from the service provider to the customer). Therefore, in accordance with an embodiment of the present invention, flows are collected and monitored only on these egress links in order to reduce the collection volumes and the associated computational requirements of detecting anomalies in the collected flow data. Once this flow data is collected, at step 303 anomaly detection is performed, also discussed further herein below. Then, at step 304, these anomalies are clustered into events corresponding to potential DDoS attacks. Finally, at step 305, the clustered anomalies are filtered to remove any anomalies that occur for known reasons or can otherwise be discarded as not being related to DDoS attacks.

As discussed previously, one reason prior attempts implemented DDoS detection solutions in the core network or peering provider edge routers of the network was to reduce resource costs. In accordance with an embodiment of the present invention, in order to keep operational, storage and computation resource costs low in the lightweight anomaly detection stage discussed above, a simple trigger algorithm is used to generate a trigger to initiate a more detailed flow analysis. Illustratively, this trigger algorithm uses a prediction model which indicates an expected mean and an expected variance for the traffic time series (e.g., the number of packets received per unit time) and assigns a deviation score, in terms of the number of standard deviations away from the mean of this time series, that a given collected observation is found to be. Such a traffic time series is, illustratively, denoted by T(t) and is, for example, defined by the equation:

$$T(t) = P(t) + V(t) + A(t) \quad \text{(Equation 1)}$$

where P(t) represents a predicted mean traffic rate (e.g., predicted average packets per second from the network to the customer); V(t) represents a stochastic noise that is expected for the traffic; and A(t) is a component representing an anomaly associated with a DDoS attack.

FIGS. 4A, 4B and 4C show algorithms for detecting DDoS attacks and generating alarms in response to such a detection. Specifically, for each customer interface between a provider customer edge router, a period of time is selected such as, for example, a period of W weeks. Then, an empirical mean-variance model is built using the last W weeks period by simple averaging over a basic time periodicity of, illustratively, one week. For example, in order to estimate the expected traffic over the customer interface for the 5 minute interval of Friday, 9:00 am-9:05 am, at step 401 the W past Fridays are measured and the mean of the traffic during this time period on Fridays over the past W weeks is calculated. This period over the past W Fridays is referred to herein as the set (TS) of training data. As one skilled in the art will recognize, as this set of training data could contain DDoS attacks and is finite in size a de-noising step is desirable. Such a de-noising step 402 is, illustratively, performed using a Fourier transform. As one skilled in the art will recognize, a Fourier transform converts a time-series signal in the time domain into its constituent frequency components in the frequency domain. By considering the top-k frequency components the high-energy components of the time series signal are captured, the low-energy/less-dominant possibly stochastic components are ignored and possibly anomalous observations are eliminated. One skilled in the art will also recognize that applying Fourier transforms to reduce noise in such a time series is extremely well known. Thus, one skilled in the art will fully appreciate, in light of the foregoing description, how to apply such a Fourier transform for these purposes. Once this de-noising step has been performed then, at step 403, the algorithm determines the variance over the last W observed data points (e.g., the last W Fridays during 9:00-9:05 am) corresponding to the de-noised mean model. Once the de-noised mean P' of the traffic during the identified time period (i.e., 9:00-9:05 am on Fridays over the past W weeks) and the variance V of that mean over the last W observed data points are calculated, then anomaly detection is performed over the specified time period according to the algorithms of FIGS. 4B and 4C.

Specifically, FIGS. 4B and 4C show an algorithm for performing such anomaly detection in real-time. At a high level, the estimated mean and the variation obtained in the algorithm of FIG. 4A are input at step 404 and are used to obtain deviation scores D(i) at step 405 for new observations. This deviation score D(i) is defined by the equation:

$$D(i)=(T(i)-P(i)/V(i))$$ (Equation 2)

where the variables are defined as discussed herein above and I is the observed data point. The deviation score of Equation 2 represents the number of standard deviations that the observed data point is away from the predicted data point. Once the deviation scores have been computed, a clustering procedure is performed at step 406 to cluster anomalous incidents into discrete events. Such clustering is useful to reduce the load on the collection mechanism by reducing the number of queries necessary to retrieve from the database the flow data for anomaly detection purposes. Such a load reduction may be significant given the relative long time over which some DDoS attacks may occur. FIG. 4C shows an algorithm for clustering in accordance with one embodiment of the present invention. Referring to that figure, a clustering method operates based on two pre-defined deviation score thresholds, referred to herein as an event trigger threshold, $\alpha_{trigger}$ and an event extension threshold, $\alpha_{add}$, as well as a time duration denoted as "keepalive" during which anomalous detected observations will be classified as a single event. Specifically, when data possibly corresponding to a DDoS event is observed, at step 407 the clustering procedure of FIG. 4C attempts to classify new anomalous events as being within a currently active event if the new observation has a deviation score that exceeds the event extension threshold $\alpha_{add}$, and if at step 408 the observation is determined to be within the time duration of keepalive, since the start of the event. As one skilled in the art will recognize, the parameter keepalive is a tunable parameter that is illustratively set to a 15 minute interval which illustratively corresponds to three SNMP observations. If there is no active ongoing event, at step 409 the algorithm creates a new event if the observed deviation score D(i) is higher than the event trigger threshold $\alpha_{trigger}$. Accordingly, once the algorithm of FIG. 4C has been performed, at step 410 the output is one or more alarms representing possible DDoS attacks, along with an associated score representing the deviation from the expected value of the measured characteristic (e.g., number of packets per second over a given time period).

Once these alarms have been generated then, referring once again to FIG. 4B, at step 411 the alarms are filtered to remove or discard anomalies that occurred for known reasons. Some illustrative rules that may be used for this purpose include, in one embodiment, an absolute volume threshold used to remove all alarms which do not have an average bandwidth of more than a pre-defined threshold. As one skilled in the art will recognize, this allows the operator of the monitoring system to specify a minimum attack rate of interest, to reduce the overall workload for the monitoring and detection system. Other rules may include, for example, a rule to remove anomalies in the SNMP data caused by router resets and SNMP implementation faults. In particular, as one skilled in the art will recognize, it may be desirable to remove the first SNMP counters after a system reset as well as measurements which indicate a bandwidth utilization of more than the physical bandwidth, which are obviously erroneous.

The result of the foregoing algorithms of FIGS. 4A, 4B and 4C therefore, is a set of alarms in response to data flows across the egress interface from the service provider to a customer on which unexplained anomalies rising above a predetermined threshold were observed, as well as start and end timestamps corresponding to those suspected anomalies. These alarms are then used to trigger a fine-grained analysis function for the detailed collection and analysis of the alarm events.

Figure 5:
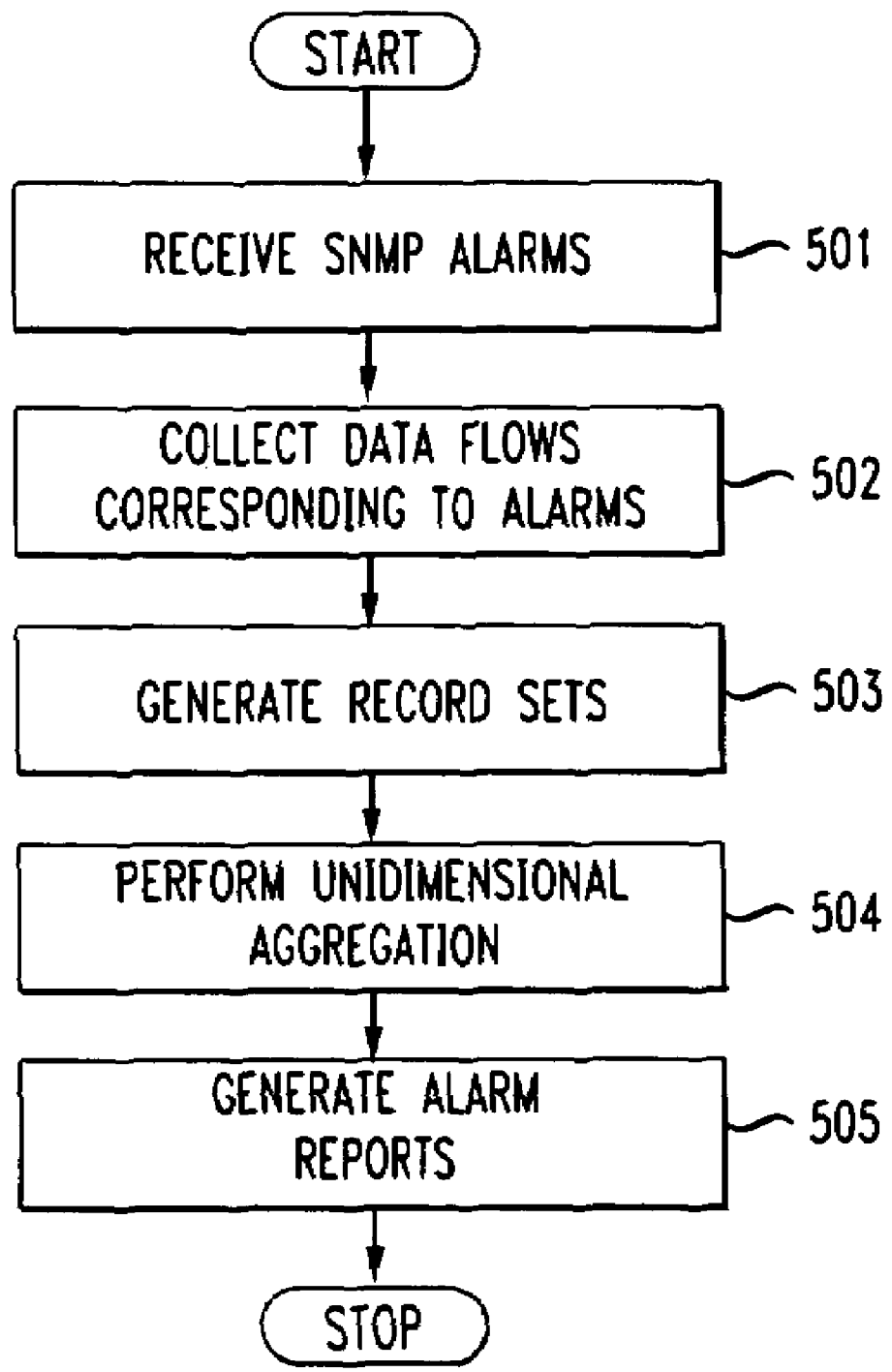
FIG. 5 is a flow diagram of an illustrative focused anomaly detection method in accordance with an embodiment of the present invention.

FIG. 5 shows the illustrative steps of a method for the aforementioned fine-grained analysis of alarm events. In particular, this fine-grained data can be obtained from well-known Netflow data that is collected and analyzed for each of the alarm events. As one skilled in the art will recognize, Netflow is an open standard for collecting detailed Internet Protocol traffic information. Routers with Netflow functionality enabled generate Netflow records, which are typically exported from the router in packets and sent to a Netflow collector, which is typically a program operating on a computer that is adapted to receive, store in a database and analyze the information to detect the existence of various conditions. Referring to FIG. 5, at step 501 the SNMP alarms generated by the algorithms of FIGS. 4A, 4B and 4C are received. Then, at step 502, all Netflow flows illustratively obtained from a Netflow collector and corresponding to the egress interface for the time periods identified in the alarms are collected from the database, which may be a database on the router providing the egress interface to the customer or may be a database stored at a central location. Next, at step 503, Netflow record sets are created. One skilled in the art will recognize that many such record sets may be build from data collected via Netflow. However, in accordance with an illustrative embodiment of the present invention, three such sets are built from records containing fine-grained information that are the most closely related to the sources of DDoS attacks: records where the TCP SYN flag is set; records where the TCP RST flag is set; and records for the ICMP protocol, referred to herein as SYN set, RST set and ICMP set, respectively. One skilled in the art will recognize that this embodiment is merely illustrative and that any parameters potentially indicative of flow anomalies may be used to build these record sets.

As one skilled in the art will recognize, the TCP SYN flag is a flag that is set by a sender of data when it is desired to synchronize the TCP stacks of the sender and the recipient. As is also well-known, one method of accomplishing a DDoS attack is to set this flag for TCP connection requests in packets originating from randomly-generated source addresses (e.g., from a remotely controlled network of compromised computers, as discussed above) and then to send those TCP connection requests faster than the target machine can process them. The target computer responds to each of the IP addresses originating a request and then waits for confirmation to the response that never arrives (e.g., typically waits about 3 minutes). During this time, the connection table of a target computer fills up and, after this table fills up, all new connections from, for example, legitimate users, are ignored, thus resulting in a DoS condition.

The TCP RST flag is a flag that may also be used by DDoS attackers to initiate an attack known in the art as a reset attack. A reset attack is an attack on a connection between a source computer and a destination computer in which a third party sends a packet by using the legitimate source address of the legitimate source computer and the destination address of the destination computer. The third party sets the TCP reset bit in the packet and, as a result, falsely terminates the established TCP connection between the source and destination computers. This results in a denial of service until the connection can be reestablished.

The well-known Internet Control Message Protocol (ICMP) is a protocol that generates messages, delivered in IP packets, that are used for out-of-band messages related to network operation. As is also well known, ICMP contains various flaws that can be exploited by an attacker to initiate a DDoS attack. Thus, for the foregoing reasons, records with the TCP SYN flag set, records with the TCP RST flag set, and records where ICMP is used are useful in verifying the SNMP alarms generated as discussed above.

Next, at step 504, for each of the set reports collected above, a clustering algorithm is applied to the traffic volumes for all destination prefixes with a prefix length larger than a predetermined value. Such a clustering algorithm is shown in FIG. 6. Referring to that figure, there are two general steps involved in such an algorithm: an aggregation step 601 and a reporting step 602. The aggregation step 601 counts the total traffic volume received by each distinct destination prefix that is larger than a minimum prefix-range size, denoted in FIG. 6 by the variable MinPrefix. Since, as discussed previously, DDoS attacks on customer egress links are typically the easiest to detect, aggregation can be performed on only the smaller prefix ranges corresponding to these links. Accordingly, the compute and memory overhead required for the aggregation step 601 will be reduced. Then, at the reporting step 602, aggregated counters are used to determine whether to report a particular prefix range as being a potential attack target. Reports are generated on larger prefixes if they carry substantially more traffic than a previously reported smaller prefix range and if they are above the absolute volume threshold. This absolute volume threshold is determined according to the size of the prefix range by a specificity parameter that determines an appropriate scaling factor corresponding to this size.

Referring once again to FIG. 5, once the aggregation of FIG. 6 has been performed, a final bandwidth attack alarm is generated at step 505 if the set of data corresponding to all flows indicates the traffic in those flows exceeds a predetermined configurable Bandwidth Attack Threshold. Additionally, a final SYN/ICMP/RST alarm will be generated if the corresponding SYN/ICMP/RST flow data indicates an IP prefix range that carries more traffic than a desired configurable SYN/ICMP/RST threshold. Instead of using a fixed rate threshold across all alarms, a duration-adaptive rate threshold is illustratively used that attempts to balance the sensitivity between high intensity low duration attacks, and relatively lower intensity but higher duration attacks. This can be achieved by using a simple depreciation approach, so that the rate threshold is a monotonically decreasing function of the alarm duration. Illustratively, a geometrically decreasing depreciation function may be used for this purpose, generated according to the following formula:

$$\text{Rate(Duration)} = \text{Rate(BaseDuration)} * \text{DecreaseFactor}^{\text{Duration/BaseDuration}}$$

where, in one illustrative embodiment, the BaseDuration is 300 seconds, and the DecreaseFactor is set to 0.95.

Figure 7:
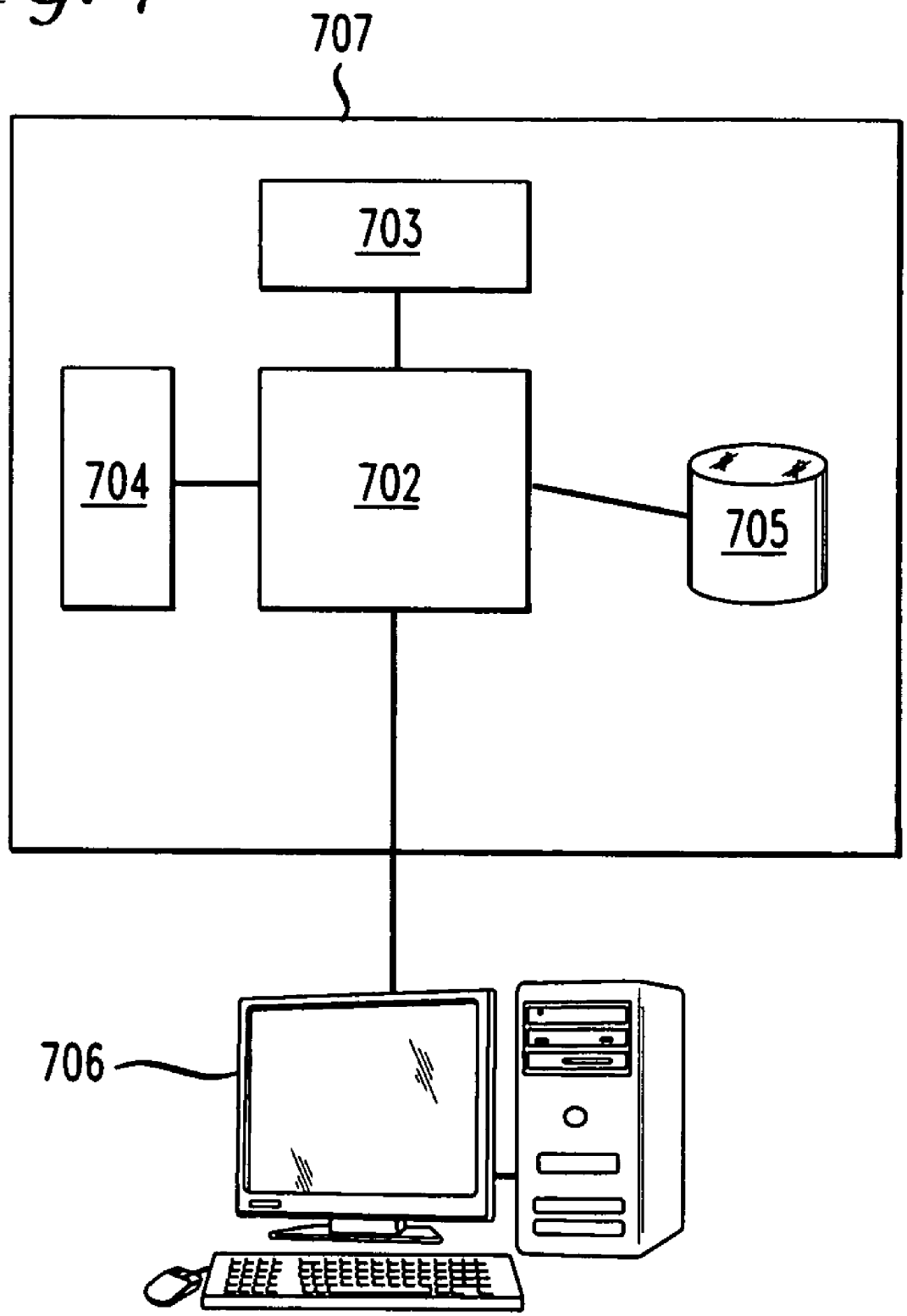
FIG. 7 shows a schematic diagram of a computer adapted to perform the steps of a computer program adapted to perform the steps of a DDoS monitoring and detection system in accordance with an embodiment of the present invention.

FIG. 7 shows a block diagram of an illustrative router, such as a customer provider edge router that is adapted to perform the steps of an algorithm for collecting data and monitoring data and performing the steps of the various algorithms as described herein above. Referring to FIG. 7, router 707 may be implemented on any suitable computer adapted to receive, store and transmit data such as the aforementioned algorithm calculations. Illustrative system 707 may have, for example, a processor 702 (or multiple processors) which controls the overall operation of the system 707. Such operation is defined by computer program instructions stored in a memory 703 and executed by processor 702. The memory 703 may be any type of computer readable medium, including without limitation electronic, magnetic, or optical media. Further, while one memory unit 703 is shown in FIG. 7, it is to be understood that memory unit 703 could comprise multiple memory units, with such memory units comprising any type of memory. System 707 also comprises illustrative network interface 704 for use in, among other functions, collecting traffic flow data for use with the DDoS attack detection algorithms described herein above. System 707 also illustratively comprises a storage medium, such as a computer hard disk drive 705 for storing, for example, data and computer programs adapted for use in accordance with the principles of the present invention as described hereinabove. One skilled in the art will recognize that flash memory may preferably be used in some implementations in place of hard disk drive 705. Finally, system 707 may also have illustrative terminal 706 having, illustratively, keyboard 708 and monitor 709 for inputting information and displaying results of the foregoing calculations. One skilled in the art will recognize that system 707 is merely illustrative in nature and that various hardware and software components may be adapted for equally advantageous use in a computer in accordance with the principles of the present invention.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for detecting a distributed denial of service attack comprising:

collecting a first set of data associated with a first data flow at a router in a service provider network, the first data flow comprising a number of packets transmitted to a customer network over a predetermined period of time;

removing noise from an average value of a first characteristic of the first data flow over the predetermined period of time by applying a Fourier transform to the average;

detecting whether anomalies are present in the first data flow, each of the anomalies comprising a first deviation from a predicted model of the first data flow, the predicted model being generated as a function of historical data collected at the router and the de-noised average of the value of the first characteristic;

clustering the anomalies into events corresponding to a potential distributed denial of service attack, the clustering of the anomalies comprising:

calculating a deviation score associated with an observed value of the at least a first characteristic, if the deviation score is above a predetermined value, identifying the observed value as an anomaly, determining whether the anomaly is a new anomaly, and if the anomaly is not a new anomaly, clustering the anomaly as a part of an existing event, the event comprising a plurality of anomalies;

filtering the anomalies to remove particular ones of the anomalies occurring for reasons known to be unrelated to distributed denial of service attacks;

in response to the detection of the anomalies in the first data flow, receiving a second set of data associated with a second data flow;

analyzing at least a portion of the second set of data to determine whether the anomaly represents an attack on a computer network; and generating an alarm if it is determined that the anomaly represents an attack.

2. The method of claim 1 wherein the router comprises a customer provider edge router in the service provider network.

3. The method of claim 2 wherein the customer provider edge router comprises a router for interfacing a customer network to the service provider network.

4. The method of claim 1 wherein the attack on a computer network comprises a distributed denial of service attack.

5. The method of claim 1 wherein the first data flow comprises a Simple Network Management Protocol data flow.

6. The method of claim 1 further comprising determining a variance of the first data flow over the predetermined period of time.

7. The method of claim 1 wherein the deviation score is calculated according to the equation:

$$D(i)=(T(i)-P(i))/V(i)$$

where D is the deviation score, T is the time series of the at least a first characteristic, P is the average of the at least a first characteristic over a predetermined period of time; and V is the variance model of the at least a first characteristic over a predetermined period of time.

8. The method of claim 1 wherein the first data flow comprises the second data flow.

9. The method of claim 1 wherein the second data flow comprises at least a first Netflow record.

10. The method of claim 9 wherein the at least a first Netflow record comprises all Netflow records generated over a predetermined period of time.

11. The method of claim 9 wherein the at least a first Netflow record comprises all Netflow records wherein a Transfer Control Protocol SYN flag is set.

12. The method of claim 9 wherein the at least a first Netflow record comprises all records where a Transfer Control Protocol RST flag is set.

13. The method of claim 9 wherein the first Netflow record comprises all Netflow records generated by an Internet Control Management Protocol.

14. The method of claim 9 wherein analyzing comprises clustering the at least a first Netflow record as a function of a portion of a destination address of the at least a first Netflow record.

15. The method of claim 14 further comprising:

determining whether an actual number of the at least a first Netflow record associated with the portion of the destination address exceeds by a predetermined threshold a predicted number of the Netflow records associated with the portion of the destination address; and if the actual number exceeds a predicted volume by at least the predetermined threshold, generating the alarm.

16. An apparatus for detecting a distributed denial of service attack comprising:

means for collecting a first set of data associated with a first data flow at a router in a service provider network, the first data flow comprising a number of packets transmitted to a customer network over a predetermined period of time;

means for removing noise from an average value of a first characteristic of the first data flow over the predetermined period of time by applying a Fourier transform to the average;

means for detecting whether anomalies are present in the first data flow, each of the anomalies comprising at least a first deviation from a predicted model of the first data flow, the predicted model generated as a function of historical data collected at the router and the de-noised average of the value of the first characteristic;

means for clustering the anomalies into events corresponding to a potential distributed denial of service attack, the means for clustering the anomalies comprising:

means for calculating a deviation score associated with an observed value of the at least a first characteristic;

means for identifying the observed value as an anomaly if the deviation score is above a predetermined value;

means for determining whether the anomaly is a new anomaly; and means for clustering the anomaly as a part of an existing event if the anomaly is not a new anomaly, the event comprising a plurality of anomalies;

means for filtering the anomalies to remove particular ones of the anomalies occurring for reasons known to be unrelated to distributed denial of service attacks;

means for receiving a second set of data associated with a second data flow in response to the detection of the anomalies in the first data flow;

means for analyzing at least a portion of the second set of data to determine whether the anomaly represents an attack on a computer network; and means for generating an alarm if it is determined that the anomaly represents an attack.

17. The apparatus of claim 16 wherein the router comprises a customer provider edge router in the service provider network.

18. The apparatus of claim 17 wherein the customer provider edge router comprises a router for interfacing a customer network to the service provider network.

19. The apparatus of claim 16 wherein the attack on a computer network comprises a distributed denial of service attack.

20. The apparatus of claim 16 wherein the first data flow comprises a Simple Network Management Protocol data flow.

21. The apparatus of claim 16 further comprising means for determining a variance of the first data flow over the predetermined period of time.

22. The apparatus of claim 16 wherein the means for calculating the deviation score comprises means for calculating the score according to the equation:

$$D(i)=(T(i)-P(i))/V(i))$$

where D is the deviation score, T is the time series of the at least a first characteristic, P is the average of the at least a first characteristic over a predetermined period of time; and V is the variance model of the at least a first characteristic over a predetermined period of time.

23. The apparatus of claim 16 wherein the first data flow comprises the second data flow.

24. The apparatus of claim 16 wherein the second data flow comprises at least a first Netflow record.

25. The apparatus of claim 24 wherein the at least a first Netflow record comprises all Netflow records generated over a predetermined period of time.

26. The apparatus of claim 24 wherein the at least a first Netflow record comprises all Netflow records wherein a Transfer Control Protocol SYN flag is set.

27. The apparatus of claim 24 wherein the at least a first Netflow record comprises all records where a Transfer Control Protocol RST flag is set.

28. The apparatus of claim 24 wherein the first Netflow record comprises all Netflow records generated by an Internet Control Management Protocol.

29. The method of claim 24 wherein the means for analyzing comprises means for clustering the at least a first Netflow record as a function of a portion of a destination address of the at least a first Netflow record.

30. The apparatus of claim 29 further comprising:

means for determining whether an actual number of the at least a first Netflow record associated with the portion of the destination address exceeds by a predetermined threshold a predicted number of the Netflow records associated with the portion of the destination address; and means for generating the alarm if the actual number exceeds a predicted volume by at least the predetermined threshold.

* * * * *